United States Patent [19]

Suzuki et al.

[11] 4,196,784

[45] Apr. 8, 1980

[54] WEIGHING SCALE WITH LOAD CELL

[75] Inventors: Seiji Suzuki; Hitoshi Nimura, both of Shizuoka; Tohru Kitagawa; Kazuo Watanabe, both of Mishima, all of Japan

[73] Assignee: Tokyo Electric Company, Limited, Tokyo, Japan

[21] Appl. No.: 928,520

[22] Filed: Jul. 27, 1978

[30] Foreign Application Priority Data

| Aug. 1, 1977 | [JP] | Japan | 52/103661[U] |
| Aug. 10, 1977 | [JP] | Japan | 52/95851 |
| Aug. 10, 1977 | [JP] | Japan | 52/95852 |
| Feb. 23, 1978 | [JP] | Japan | 53/20200 |

[51] Int. Cl.² .......................... G01G 3/14; G01L 1/22
[52] U.S. Cl. ............................ 177/211; 73/141 A; 73/229
[58] Field of Search ............... 177/211, 229, DIG. 9; 73/141 A

[56] References Cited

U.S. PATENT DOCUMENTS

| 3,512,595 | 5/1970 | Laimins | 177/211 X |
| 3,805,604 | 4/1974 | Ormond | 177/211 X |
| 3,994,161 | 11/1976 | Trozera | 177/211 X |
| 4,036,316 | 7/1977 | Rock | 177/DIG. 3 |
| 4,107,985 | 8/1978 | Sommer | 177/211 X |

Primary Examiner—Joseph W. Hartary
Attorney, Agent, or Firm—Oblon, Fisher, Spivak, McClelland & Maier

[57] ABSTRACT

A weighing scale with a load cell is disclosed. The load cell is integrally formed by casting and transmits only vertical motions to the strain gauges so tht moment forces induced by off center loads will not cause inaccurate readings. A stopper limits the movement of the load transmission section to prevent excessive beam movements and to prevent the pivot shaft from falling out of the cell. The gauge circuitry includes a temperature compensation circuit and is attached to one surface of the load cell. Blank or runner ribs are formed in the load cell during casting and are later removed by machining.

11 Claims, 17 Drawing Figures

WEIGHING SCALE WITH LOAD CELL

DESCRIPTION OF THE PRIOR ART

This invention relates to a weighing scale with load cell for measuring the weight by electrically detecting deformation of strain gauges.

A weighing scale with load cell in general includes a beam equipped with two oval holes and four strain gauges bonded at its four thin-thickness portions so that when a load is applied to the tip of the beam, deformation due to the load is converted into an electric signal by the four strain gauges for measuring the weight. It is for this reason that the essential component of the weighing scale of this type is the beam equipped with the strain gauges, or, the load cell. Load cells of a varying construction are available for producing the weighing scale. For example, there is a type in which a receiving tray is directly connected to the tip of the beam. In the scale of this kind, it is necessary to correctly place an article to be weighed at the center of the receiving tray unless otherwise an eccentric load due to moment acts on the beam, and deformation of the strain gauge-bonded portion of the beam does not conform with the load value and tends to generate the measurement error.

To cope with this problem, there is proposed such a type in which a plurality of check links are interposed cubically between the tip of the load cell and the receiving tray in order to prevent the eccentric load from acting on the load cell. However, the link mechanism again invites various problems from the aspect of production because it has a complicated construction and cells for a high level of accuracy in the assembly.

SUMMARY OF THE INVENTION

It is therefore a first object of the present invention to obtain a weighing scale with load cell having a simple construction and a high level of measuring accuracy.

The second object of the present invention is to obtain a weighing scale with load cell which facilitates to fit a bellows for the protection of strain gauges to be bonded to the beam.

The third object of the present invention is to obtain a weighing scale with load cell which enables integral shaping of the beam and the arm body with a high level of accuracy.

The fourth object of the present invention is to obtain a weighing scale with load cell which is capable of preventing the application of excessive load to the beam by way of restricting excessive movement of moving parts.

The fifth object of the present invention is to obtain a weighing scale with load cell which is capable of synthetically adjusting the temperature characteristics of electric circuit components wired electrically to the strain gauges.

DESCRIPTION OF THE PREFERRED EMBODIMENTS

The first embodiment of the present invention will now be explained with reference to FIGS. 1 through 4. Reference numeral 1 designates a base as a securing section and a support pole 2 is implanted perpendicularly onto one side of this base 1. An arm section 3 of a parallelogrammic shape is secured to the support pole 2. In other words, the arm section 3 consists of a thick base side 4, a moving side 5 for bearing a load and thin arms 6, 7. On the base side 4 is formed a slit 8 into which the abovementioned support pole 2 is fitted and which is secured by two lock bolts 9. On the moving side 5 is formed also a slit 10 into which a support shaft 12 of a receiving tray 11 is fitted and which is likewise secured to the moving side. At the upper portion of the moving side 5 is formed a load transmission section 13 of a large thickness which protrudes inwardly in the horizontal direction. A beam 14 extends from the inner surface of the base side 4 down to the lower portion of the load transmission section 13 and integrated with the same. Namely, the beam 14 is located on the same plane as the arm 13, and has a power-receiving section 15 at its tip and two oval holes 16 communicating with each other at the intermediate portion. These oval holes together form four deforming sections 17 of a thin thickness that describes a parallelogram. Four strain gauges 18 are attached around the outer periphery of these deforming sections 17, respectively, to form a bridge circuit though not specifically shown in the drawing, in order to pick up the deformation of the deforming sections 17 as an electric signal. An annular flange 19 is formed integrally with the beam 14 at its tip and its base end portion and both ends of a bellows 20 are hermetically secured to these flanges without any mechanical influence.

The arm section 3 and the beam 14 are integrally formed by forging. At the base end of the arm 6 and the arm 7 are formed arcuate recesses by machining, the recesses in turn defining four bent sections 21 of a thin thickness. Holes 22, 23, 24, 25 are bored on the arm 6, the arm 7, the protruding load transmission section 13 and the power-receiving section 15, respectively, and on the approximately same perpendicular line. A pivot 26 is fitted into the hole 24 and secured thereto with its shaft portion facing downward and a pivot 27 is fitted into the hole 25 and secured thereto with its shaft portion facing upward. A pivot shaft 28 is interposed between these pivots 26 and 27 in point contact therewith. Fitting of the pivot shaft 28 is carried out while causing the arm section 3 to deform.

Under the construction described above, when an article to be weighed is placed on the receiving tray 11, its weight is applied to the power-receiving side 5 of the arm section 3 through the support shaft 12. Since the mechanical strength is extremely weak in the direction of the plane including the arm section 3 of the bent portion 21, however, the perpendicular load is applied to the tip of the beam 14 from the load transmission section 13 through the pivots 26, 27 and the pivot shaft 28 whereby the beam 14 causes deformation which is picked up by the strain gauges 18 as an electric signal. In this case, if the article to be weighed is placed at one corner of the receiving tray 11, a moment acts on the power-receiving side 5. However, since the bent portion 21 of the arm section 3 is highly resistant to elongation and torsion, the arm section 3 itself absorbs the load in the directions other than in the perpendicular direction. Even if considerable inclination or torsion occurs, the inclination of the pivot shaft 28 is extremely slight and a substantially perpendicular load acts on the power-receiving section 15 of the beam 14. For this reason, the measurement error is extremely small and does not render any practical problem irrespective of the position of the article to be weighed on the receiving tray 11.

In this first embodiment two parallelograms of the arm section 3 and beam 14 are positioned on the same plane as mentioned above so that a torsion load, etc. is absorbed by the arm section 3 no matter at which position the article to be weighed is placed on the receiving tray 11, thereby enabling to apply only the perpendicular load to the beam 14 and thus enhancing the measuring accuracy. Because the arm section 3 is integrally formed with the beam 14, their production is easy. Moreover, coupling between the arm section 3 and the beam 14 is effected by means of the pivot shaft 28, transmission of load between them is accurate, is especially free from the factors causing the measurement error such as a torsion load with respect to the beam 14 and enables to apply only the perpendicular load to the beam.

Next, the second embodiment of the present invention will be made apparent by referring to FIGS. 5 through 9. The load cell main body 29 is first produced by forging, casting or other means. The beam 31 and the arm body 32 are formed to extend from the perpendicular base side 30 of the load cell main body 29 and fall on the same plane with each other. Though the load cell main body 29 is of course machined after shaping, the condition prior to the machining is explained with reference to FIG. 6. A groove section 33 for attaching electric circuit components is formed on one side surface of the base side 30 and the beam 31 extends horizontally from the inner portion of the base side substantially therebelow. A groove section 34 is formed on the beam 31 at its base end portion and an annular flange 35 is then formed. Namely, a hole 36, another flange 37 and a power-receiving section 38 are formed on the beam 31 in order named. A rib 40 is formed to extend from the base side 30 to the moving side 39 of the arm body 32 and a blank rib 41 is formed between the rib 40 and the beam 31 and connected with the rib 40. The blank rib 41 acts as a reinforcing member to prevent deformation at the time of shaping. The arm body 32 consists of arms 42, 43 of thin plates that are provided horizontally at the upper and lower portion of the base side 30 and the moving side 39, respectively, so as to define a parallelogram.

Figure 1:
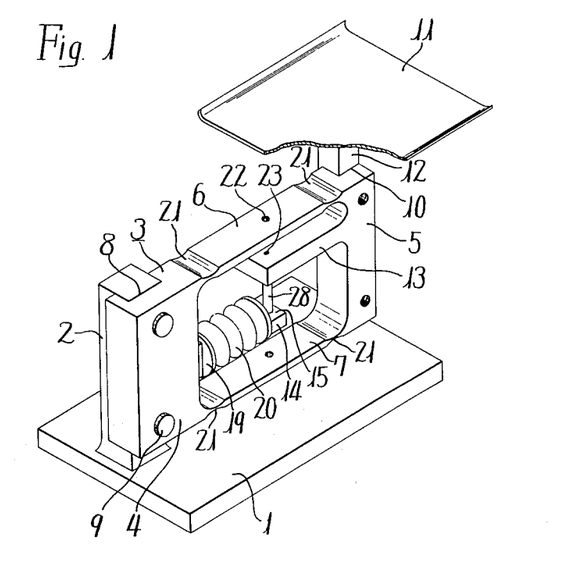
FIG. 1 is a perspective view of the first embodiment of the present invention.
Figure 2:
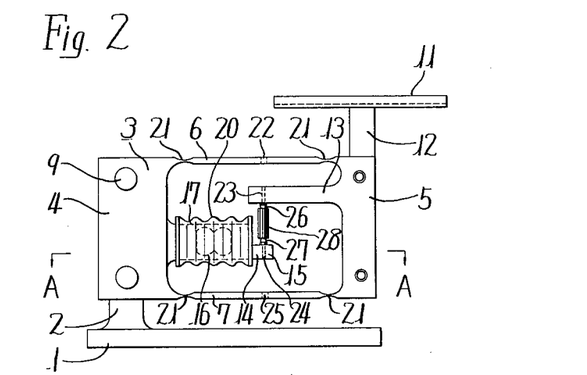
FIG. 2 is a front view of the first embodiment.
Figure 3:
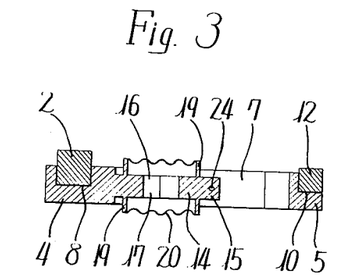
FIG. 3 is a sectional view taken along line A—A of FIG. 2.
Figure 4:
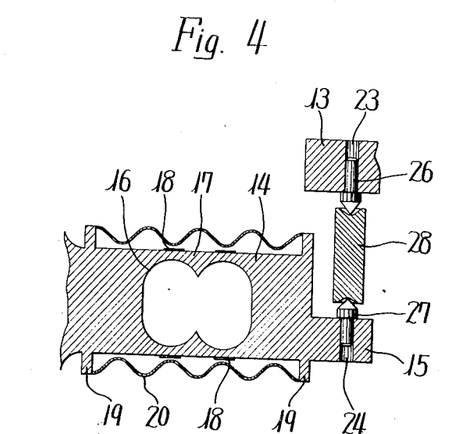
FIG. 4 is a partially enlarged, longitudinally sectional front view.
Figure 5:
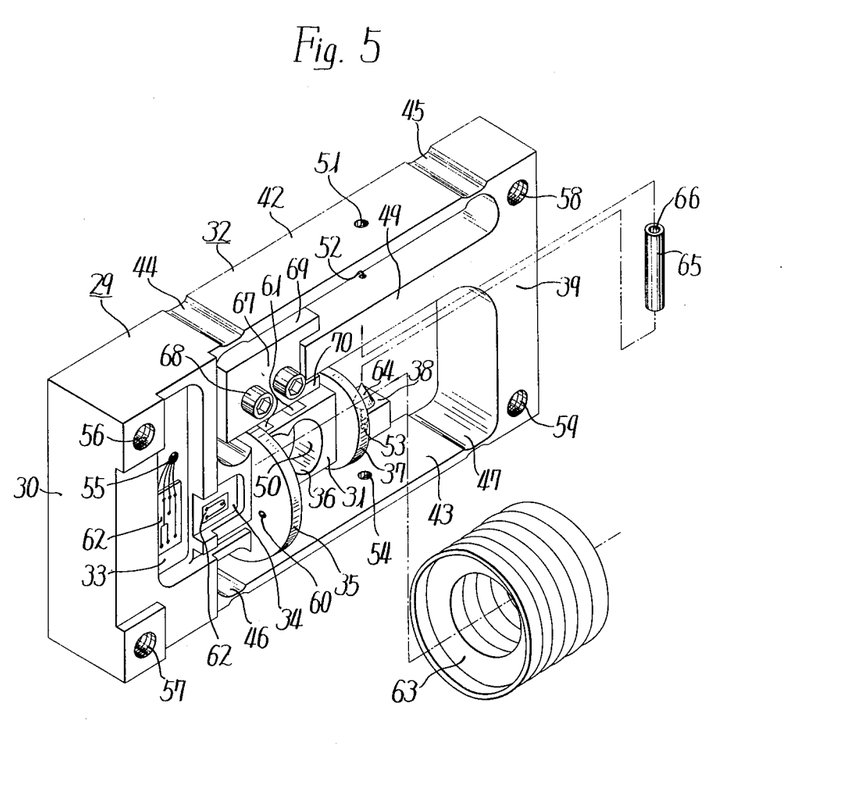
FIG. 5 is a partially exploded perspective view of the second embodiment of the present invention.

Machine work is applied to the abovementioned blank to finish the load cell main body 29. First, arcuate slits are cut from above and below at four positions near the base portion of the arms 42, 43 of the arm body 32 to thereby define four thin thickness sections 44, 45, 46, 47. The blank rib 41 is then removed to separate the rib 40 from the beam 31. The rib 40 is positioned near the base side 30 and cut, and its portion near the base side 30 is used as a stopper fitting section 48 while its portion near the moving side 39 is used as a load transmission section 49. The abovementioned holes 37 of the beam 31 are shaped into two oval holes 50. Four holes 51, 52, 53, 54 are bored on the arms 42, 43, the power-receiving section 38 of the beam 31 and the load transmission section 49 on the approximately same perpendicular line. Furthermore, a lead wire hole 55 is formed in the abovementioned groove section 33. Four set screw holes 56, 57, 58, 59 are formed above and below the base side 30 and the moving side 39. A lead wire hole 60 also is formed on the flange 35.

Four strain gauges 61 are bonded to the above and below the two oval holes 50 of the beam 31 of the load cell main body 29 thus formed and lead wires connected electrically to these strain gauges are connected to electric circuit components 62 bonded to the abovementioned groove sections 33, 34 through the lead wire hole 60. The electric circuit components 62 are a d.c. amplifier section, an A-D conversion section, a part of the bridge circuit, etc.

Next, the beam 31 is covered with a bellows 63. One end of the bellows is coupled to the end surface of the flange 35 while the other end is fitted and bonded to the flange 37. The outer diameter of the flange 35 is larger than that of the flange 37. In this case, since the distance from the flange 37 to the moving side 39 is made longer than the entire length of the bellows 63 in the load cell main body, fitting of the bellows can be made in an easy manner.

Figure 7:
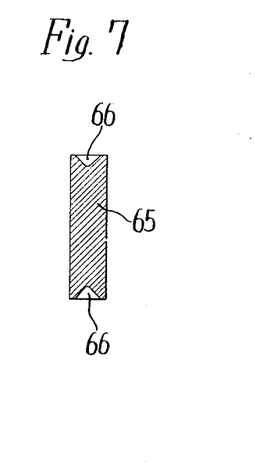
FIG. 7 is a sectional view of a pivot shaft.

Pivot receptacles 64 having a conical head are fitted into the holes 53, 54 of the power-receiving section 38 and the load transmission section 49, respectively, so as to oppose with each other and a pivot shaft 65 having a predetermined length is interposed between these pivot receptacles. Recesses 66 are formed at both ends of the pivot shaft 65 and have a predetermined mating depth with respect to the pivot receptacles 64. Hence, fitting of the pivot shaft 65 is made while twisting the arm body 32.

Figure 8:
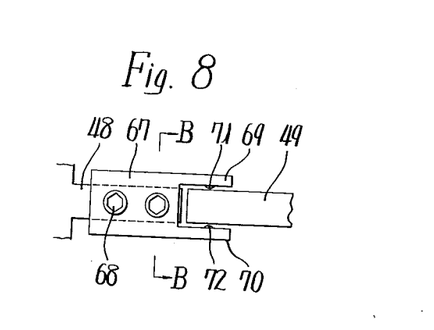
FIG. 8 is a front view of the stopper portion.
Figure 9:
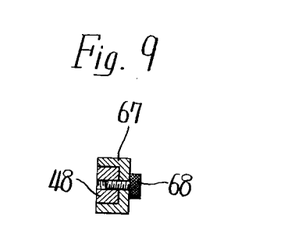
FIG. 9 is a sectional view taken along line B—B of FIG. 8.

Subsequently, a stopper 67 is adapted to the stopper fitting section 48. The stopper 67 has ]-shaped cross-section, is fitted into the stopper fitting section 48 from the front surface and secured thereto by a set screw 68. Stopper plates 69, 70 are provided to the tip of the stopper so as to position above and below the load transmission section 49, respectively, and protuberances 71, 72 are formed on the opposed surface of these stopper plates 69, 70 with a certain gap relative to the load transmission section 49. The gap between the upper protuberance 71 and the load transmission section 49 is especially set so as to be smaller than the mating depth between the pivot receptacle 64 and the pivot shaft 65. Hence, the pivot shaft 65 does not come off from the receptacle even if a load is applied upwardly to the moving side 39 of the arm body 32.

Though not shown in particular, the load cell main body 29 is secured to the base by the set screw fitting holes 56, 57 on the base side 30, and a receiving tray for supporting an article to be weighed is fitted to the set screw holes 58, 59 of the moving side 39.

In the abovementioned construction, when the article to be weighed is placed on the receiving tray, a perpendicular load is applied to the moving side 39 and the parallelogrammic arm body 32 causes deformation. In this instance, since the thin thickness sections 44, 45, 46, 47 formed on the arms 42, 43 have a considerable width, they do not cause torsion but transmit the perpendicular load to the pivot shaft 65. Hence, the load applied to the beam 31 through the pivot shaft 65 is a perpendicular load and the beam 31 causes deformation in accordance with the weight of the article to be weighed, and deflection of the four strain gauges varies and provides an electric signal from the electric circuit components 62 in accordance with the weight. As the electric circuit components 63 are fitted to the load cell main body 29, they are at the same temperature as the beam 31, etc. so that their action is accurate when a temperature compensation circuit is added. If a span resistor is attached to the groove section 34 especially, it is possible to flaten the fluctuation arising from the sensitivity of the strain gauge due to the temperature and the temperature coefficient of the Young's modulus of the metallic body of the beam.

Since the strain gauges 61 are hermetically covered by the bellows 63, they have excellent moisture resistance. The bellows 63 is hermetically bonded to the flanges 35, 37 by an epoxy resin etc. and the lead wire hole 60 of the flange 35 also is hermetically closed by the epoxy resin.

Figure 6:
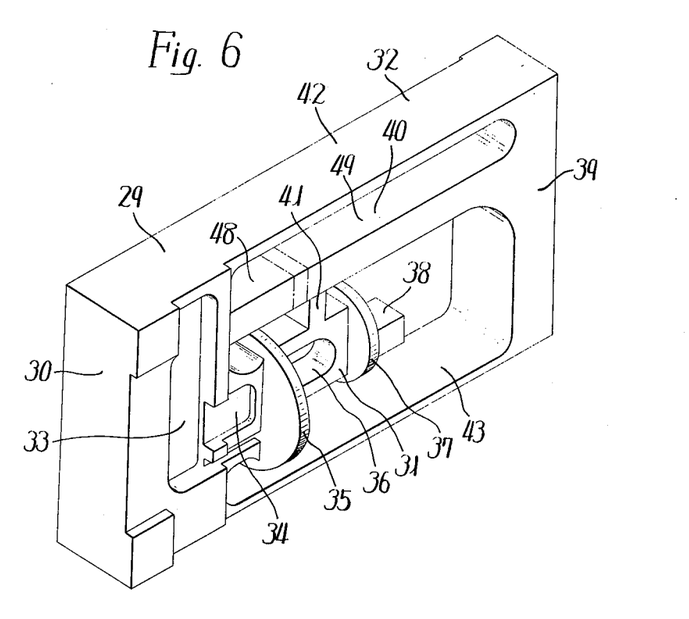
FIG. 6 is a perspective view of the load cell main body prior to machining

In the above-described embodiment the beam 31 having bonded thereto the strain gauges 61 and the arm body 32 for bearing the load are integrally formed with the base side 30 and in addition, the load transmission section 49 for transmitting the load to the beam 31 also is formed integrally with them. For this reason, the instrument of this embodiment can be easily shaped by precision casting or the like method. Since the size of the gap between the beam 31 and the moving side 39 is made longer than the free length of the bellows 63, fitting of the bellows 63 can be made easily. The stopper 67 is provided for restricting the movement of the load transmission section 49 for preventing the excessive movement of the beam 31. Provision of protuberances 71, 72 to the stopper 67 facilitates the size control of the clearance. Formation of the stopper fitting section 48 for fitting the stopper 67 and the load transmission section 49 can be made easily and accurately by first forming the rib 40 between the base side 30 and the moving side 39 and then cutting the rib 40. Formation of the blank rib 41 between the rib 40 and the beam 31 improves the dimensional stability. Furthermore, because the gap between the load transmission section 49 and the stopper 67 is made smaller than the mating depth of the pivot shaft 65, the pivot shaft 65 does not fall off in whichever direction the arm body 32 may cause deformation. The electric circuit components 62 are fitted to the base side 30 in order to improve stability with respect to the temperature change. These are the advantages of the second embodiment of the invention.

The third embodiment of the present invention will now be explained by referring to FIGS. 10 through 14.

Figure 12:
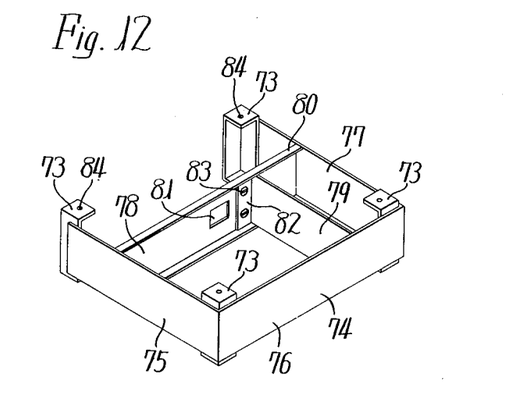
FIG. 12 is a perspective view of the frame body.

Four support poles 73 are first formed by bending a plate material and plates are spot-welded to these support poles 73 to thereby define a frame 74. In other words, the frame 74 consists of three outer plates 75, 76, 77 encompassing the outside, a fitting plate 78 bridging between the outer plates 75 and 77 and a reinforcing plate 79 interposed between the fitting plate 78 and the outer plate 76. Bent plates 80 are formed by bending the upper and lower ends of the fitting plate 78 and a rectangular hole 81 is formed at the center of the fitting plate 78. Two fitting holes 83 are formed on bent plates 82 of the reinforcing plate 79 integrally with the fitting plate 78. A screw hole 73 is formed on the upper and lower surfaces of each of the support plates 73.

Reference numeral 85 represents generally the mechanism section including the load cell main body 86, the mechanism section 85 consisting of a fitting plate 87 formed by bending a plate in an L-shape and a PC board 88 disposed along this fitting plate 87. The load cell main body 86 comprises an arm body 94 and a beam 95. The arm body 94 consists of arms 91, 92 extending respectively from a base side 90 having two set screw holes 89, and a moving side 93, said arms, said base side and said moving side together defining a parallelogram. The beam 95 extends from the base side 90 integrally therewith. Though not shown specifically, the beam 95 also is shaped in a parallelogrammic shape and possessed of four deformation sections to which strain gauges are bonded. A bellows 96 is fitted to the beam 95 to hermetically close the same. Electronic circuit components 97 are wired electrically to the strain gauges and fitted to the base side 90. The components include a temperature compensation circuit, a zero-point control circuit and the like. The electric circuit generally consists of a detector 98 including the strain gauges, an A-D conversion circuit 99 wired to the detector and a digital circuit 100 including a control circuit, etc. and wired to the A-D conversion circuit 99. A keyboard 101, and indicator 102 and a printer 103 are electrically wired to the digital circuit 100.

Figure 11:
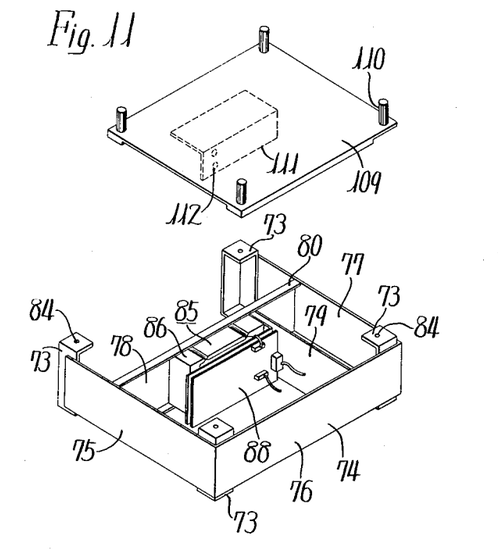
FIG. 11 is a partially exploded perspective view of the third embodiment.
Figure 13:
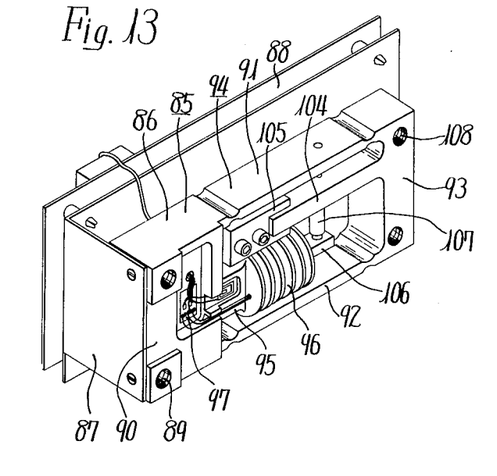
FIG. 13 is an enlarged sectional view of the mechanism as viewed from the opposite direction.

A load transmission section 104 is formed integrally with the moving side so as to position above the beam 95 and its moving quantity is restricted in the vertical direction by a stopper 105. The load transmission section is coupled to a power receiving section 106 by means of a pivot shaft 107. Two set screw holes 108 are formed on the moving side 93.

Figure 10:
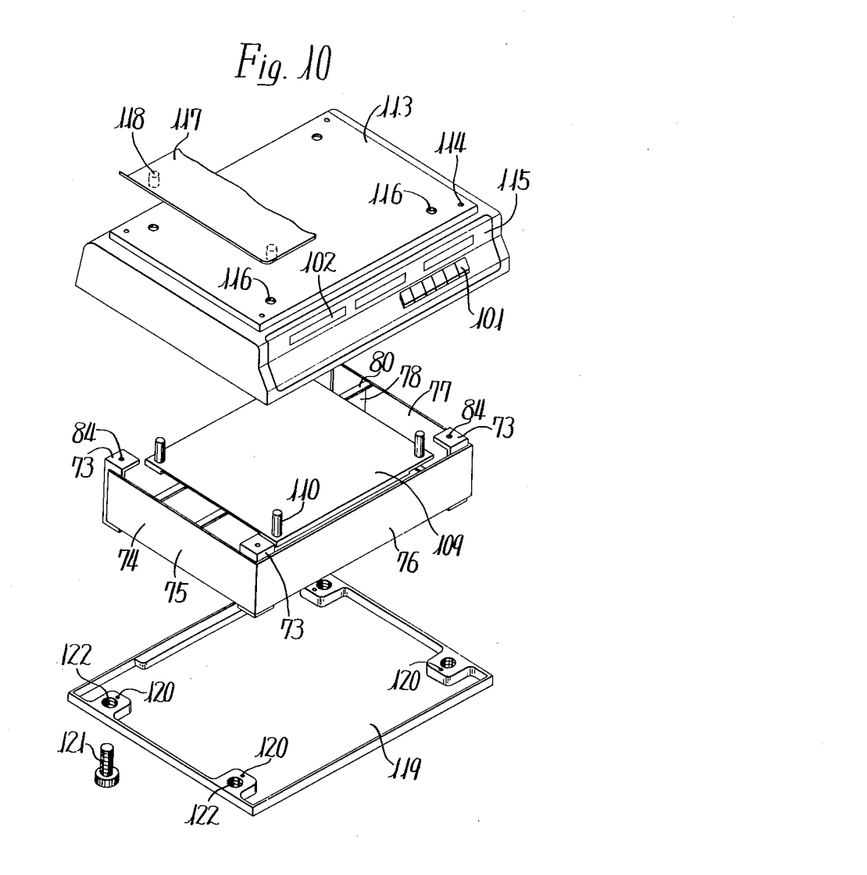
FIG. 10 is an exploded perspective view of the third embodiment of the present invention.

After the set screw hole 89 is registered with the set screw 83, the mechanism section 85 is secured to the fitting plate 87 by set screws that are not shown.

A receiving tray frame 109 is placed within the four support poles 73 and has such a size that does not interfere the support poles 73. Four receiving tray shafts 101 are implanted and secured at the four corners on the upper surface of the receiving tray frame 109, and a transmission metal 111 bent in an L-shape is secured onto the lower surface of the receiving tray frame 109. The transmission metal 111 has two fitting holes 112 through which it is fitted to the fitting screw hole 108 of the moving side 93 by means of set screws not shown.

An upper cover 113 is provided so as to cover the frame 74 and has fitting screws 114 that mate respectively with the abovementioned screw holes 84. In this manner the upper cover is detachably mounted to the frame 74 by means of set screws not shown. The keyborad 101 and the indicator 102 are provided on the front panel 115 of this upper cover 113. Four through-holes 116 are also bored on the upper frame cover 113 and allow the passage therethrough of the receiving tray shafts 110 of the receiving tray frame 109. A receiving tray 117 is placed on the upper surface of the upper cover 113 while a coupling boss 118 is secured to the lower surface, the boss being fitted into the receiving tray shaft 110 and coupled thereto.

Reference numeral 119 designates a lower cover which has four fitting holes 120 in conformity with the screw holes 84 formed at the lower portion of the support poles 73. The lower cover 119 can be mounted detachably to the support poles 73, and has four fitting screws 122 for fitting support legs 121.

Figure 14:
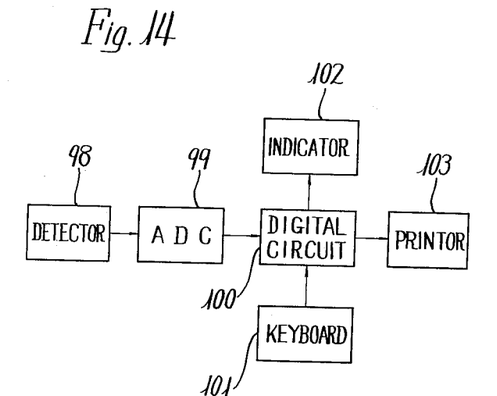
FIG. 14 is a block diagram of the electric circuit.

In the above-mentioned construction, the mechanism section 85 is covered by the upper cover 113 and the lower cover 119, and fitted and secured to the frame 74. When the article to be weighed is placed on the receiving tray 117, the load is transmitted to the moving side 93 through the coupling boss 118, the receiving tray shaft 110, the receiving tray frame 109 and the transmission metal 111 whereby a perpendicular load acts on the beam 95 from the arm body 94. Consequently, the beam 95 causes deflection and the strain gauges generate a voltage in proportion to the load which is then converted by the A-D conversion circuit 99. Hence, a digital signal is impressed to the digital circuit 100. Signals such as unit price, tare-subtraction, print indicator, etc. are keyed in from the keyborad 101 and operation processing is performed in accordance with the signals to actuate the indicator 102. The printer 102 also is actuated, whenever necessary.

The upper cover 113 and the lower cover 119 may be removed whenever desired. If either is removed, the frame 74 is open either from above or below and the mechanism section 85 is exposed, thereby ensuring the easy inspection of the mechanism. Needless to say, adjustments such as zero-point adjustment can be made easily. For the limited kinds of adjustments such as zero-point adjustment or sensitivity adjustment, however, a hole for the insertion of a screw driver may be formed on the upper cover 113.

Figure 15:
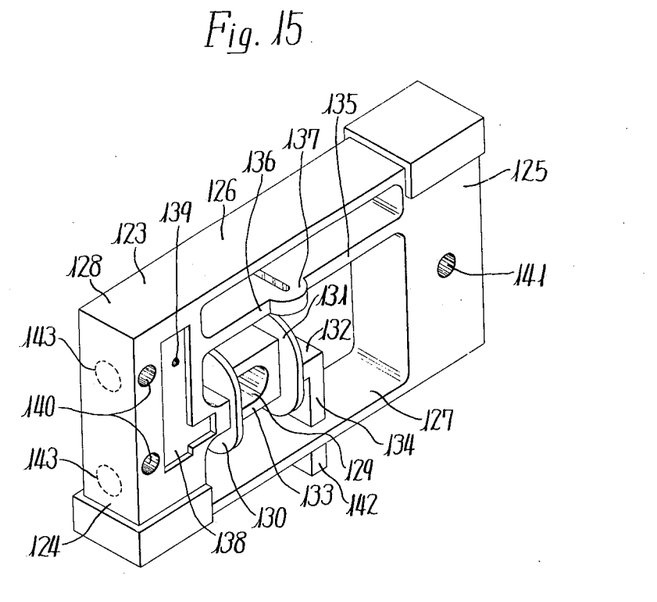
FIG. 15 is a perspective view of the casting of the load cell main body of the fourth embodiment of the present invention.
Figure 16:
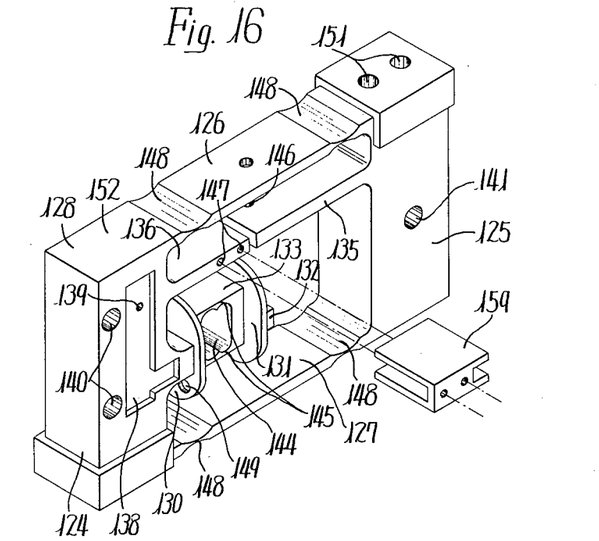
FIG. 16 is a perspective view of the load cell main body and the stopper that are subjected to the machining.

Next, the fourth embodiment of the present invention will be explained with reference to FIGS. 15 through 17. As shown in FIG. 15, the casting of the load cell main body 123 is first cast. This casting is formed by casting integrally a material having excellent mechanical strength, corrosion resistance and elasticity such as SCS24, for example. The casting is shown comprising a base side 124 and a moving side 125 that oppose with each other on both sides and a pair of arms 126 and 127 that oppose with each other in the vertical direction, said members 124–127 together forming a parallelogrammic mechanism 128. A beam 133 having a transversely elongated hole 129, a pair of flanges 130, 131 and a pressure-receiving section 132 at its tip are interconnected to the base side 124 and the pressure-receiving section 132 is further inter-connected to the arm 126 via a runner rib 134. A load transmission section 135 is inter-connected to the upper portion of the moving side 125 in parallel with the arm 126 and a stopper fitting section 136 is inter-connected to the upper portion of the base side 124. The innermost end of each of these load transmission section 135 and stopper fitting section 136 are mutually connected by an arcuate runner rib 137. An L-shaped recess 138 is formed on the side surface of the base side 124 and a through-hole 139 as well as a fitting hole 140 are formed inside the recess 138. A hole 141 also is formed on the side surface of the moving side 125.

The casting of the load cell main body 123 is formed by injecting a molten metal from a gate 142 opposed to the runner rib 134 outside the arm 127 and a gate 143 positioned on the outer side end surface of the base side 124 and the moving side 125, though illustrated only on one side in the drawing.

Subsequently, the runner ribs 137 and 142 are cut off by an end mill, etc., whereby the beam 133 is separated from the arm 127 and the load transmission section 135 from the stopper fitting section 136. By applying the end mill machining onto the side surface of the beam 133 the hole 129 is expanded to lap-form an oval hole 144, thereby forming a soft section 145 of a thin thickness on the upper and lower surfaces of the beam 133. As shown in FIGS. 16 and 17, a hole 146 is formed from above the arm 126 to penetrate through the arm 126, the load transmission section 135 and the pressure receiving section 132 of the beam 133. A fitting hole 147 is bored on the side surface of the stopper fitting section 136. Four soft sections 148 positioned respectively at the four corners of the parallelogram in parallel with the arms 126, 127 are formed by milling or the like. On the other hand, a through-hole 149 is formed on one of the flanges 130 and fitting holes 150 and 151 are formed on the bottom surface of the base side 124 and the upper surface of the moving side 125, respectively, as shown in FIGS. 16 and 17. Where it is necessary to apply the heat-treatment to the load cell main body 152 machined in this manner, hook jigs (not shown) are inserted into the holes 141 so that a plurality of the load cell main bodies 152 are heat-treated at once. An oxide film is formed on the surface of the load cell main body 152 due to the heat treatment and honing is applied at least to the outer circumferential surface of the flanges 130, 131 and the upper and lower surfaces of the beam 133 by the use of alundum abrasives of a particle size of #150–#200.

Figure 17:
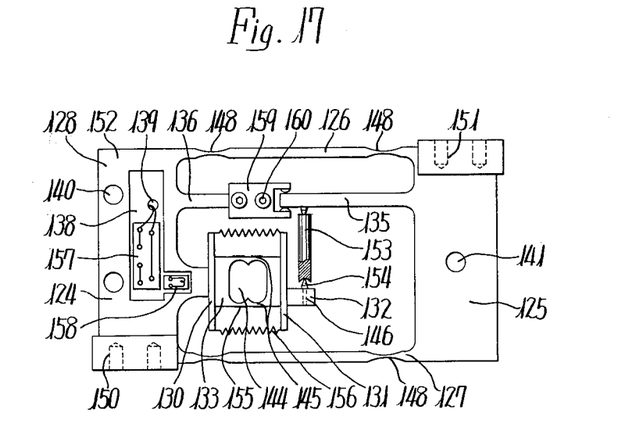
FIG. 17 is a partially cutaway front view of the load cell main body having fitted thereto each component.

Next, the pivot shaft 153 is inserted into the through-hole 146 of the load transmission section 135 as shown in FIG. 17 and a pivot 154 for supporting the pivot shaft 153 is inserted into the through-hole 146 of the beam 133. Fitting of the pivot shaft 153 and the pivot 154 is carried out while causing the deflection of the arms 126, 127. Strain gauges 155 are then attached to the soft sections 145 of the beam 133 and a bellows 156 is fitted and secured to the flanges 130, 131 for protecting the strain gauges 155 from external detrimental vapor, moisture and the like. In this case, since the bonding surface is applied with honing, wettability of an epoxy resin type adhesive is improved and adhesion as well as sealing can be made in a reliable manner. Lead wires of the strain gauges 155 are electrically connected to electronic circuit components 157 and a span compensation resistor 158 that are secured to the recess 138, through the through-hole 149 of the flange 130. Connection from the electronic circuit components 157 to the amplifier and the A-D converter is made through the through-hole 139. The amplifier and the A-D convertor are mounted onto a PC board (not shown) that is secured by the fitting holes 140.

A stopper 159 is then fitted to the fitting hole 147 of the stopper fitting section 136 by means of a bolt 160 in order to prevent an excessive movement of the load transmission section due to an excessive load or oscillation, by way of clamping the load transmission section 135 with a slight play. Using the fitting holes 150, the base side 124 is directly secured to the substrate (not shown) and a receiving tray (not shown) for supporting the article to be weighed is connected to the moving side 125 using the fitting holes 151.

When a load is applied to the receiving tray, the arms 126, 127 deflect while deflecting the soft sections 148 and the moving side 125 displaces downward whereby the load is transmitted from the load transmission section 135 to the beam 133. The degree of deflection of the soft sections 145 is detected by the strain gauges 155 which generate a signal and thus measure the weight. Since the load cell main body 152 consists integrally of the parallelogramic mechanism 128, the beam 133, the load transmission section 135 and the stopper fitting section 136, it is possible to reduce the number of components required and to simplify the construction as well as the assembly work. In addition, since the load cell main body is formed by machining the casting 123 of the load cell main body, a cut quantity is only slight, maching time can be shortened and the loss of material can be prevented. During casting, the tip of the beam 133 is inter-connected to the arm 127 by the runner rib 134 and the load transmission section 135 to the stopper fitting section 136 by the runner rib 137. Accordingly, the flow of molten metal is smooth and the internal structure can be made uniform and compact. Hence, it is possible to carry out accurate measurement with a linear load transmission characteristics. The span compensation resistor 158 functions to flatten the fluctuation due to the sensitivity of the strain gauges depending on the temperature and the change of the Young's modulus of the load cell main body 152 due to the temperature change. The strain gauges 155 are protected from the detrimental external atmosphere by the bellows 156, thereby further improving the reliability. As the base side is directly secured to the substrate while moving side 125 directly supports the receiving tray, it is possible to reduce the material required for interconnection.

In the embodiment described above, the casting of the load cell main body 123 having integrally casted the parellelogrammic mechanism 128, the beam 133 the load transmission section 135 and the stopper fitting section 136 is machined to form the load cell main body 152, thereby making it possible to drastically reduce the number of components required, to simplify the construction as well as the assembly work, to prevent the loss of materials, and to shorten the machining time. In addition, since the tip of the beam 133 is inter-connected to the arms 126, 127, and the load transmission section 136 to the stopper fitting section 136 by means of the runner ribs 134, 137, respectively, that are to be cut off at the time of machining, the internal structure of the load cell main body 152 can be made uniform and compact whereby the load transmission characteristics can be made linear and the measurement can be carried out accurately.

What is claimed is:

1. A weighing scale including a load cell, comprising:
a fixed base;
a perpendicular base side secured to said base;
a perpendicular moving side for bearing a load;
a first arm connecting the upper portions of said base side and said moving side;
a second arm connecting the lower portions of said base side and said lower side, said sides and arms being integral with one another and together forming an integral parallelogram;
a horizontal rib being integral with said sides and bridging said sides, said rib being discontinuous adjacent a midpoint along the length of said rib, the portions of said rib on either side of said discontinuity respectively forming a load transmission section and a stopper fitting section;
a stopper fitted to said stopper fitting section and engagable with said load transmission section for restricting movement of said load transmission section in the vertical direction;
a horizontal beam extending from said base side toward said moving side, said beam being integral with said base side and including a portion defining a parallelogram;
a plurality of strain gauges bonded to said parallelogram; and
a pivot shaft coupling the tip of said beam to said load transmission section.

2. The weighing scale with load cell as defined in claim 1 wherein said beam has two flanges for fitting of a bellows to protect said strain gauges bonded to said beam from the external atmosphere and the gap between the flange at the tip of said beam and said moving side is greater than the length of said bellows.

3. The weighing scale with load cell as defined in claim 1 wherein said fixed base for securing said base side is a frame fitted to support poles that detachably support an upper cover and a lower cover.

4. The weighing scale with load cell as defined in claim 3 wherein said frame is formed by plate materials that are mutually spot-welded.

5. The weighing scale with load cell as defined in claim 3 wherein a fitting plate and a reinforcing plate are spot-welded to said frame so as to criss-cross with each other and said base side is secured to said fitting plate.

6. The weighing scale with load cell as defined in claim 1 wherein a blank rib is integrally formed between said rib and said beam for preventing deformation at the time of shaping and is cut away by machining work.

7. The weighing scale with load cell as defined in claim 1 wherein said stopper is fitted so as to oppose the upper and lower surfaces of said load transmission section and a protuberance is formed on said stopper.

8. The weighing scale with load cell as defined in claim 1 wherein after said pivot shaft is fitted between said beam and said load transmission section, said stopper is fittted to said stopper fitting section, and a clearance between the upper surface of said load transmission section and said stopper is made smaller than a mating depth of said pivot shaft.

9. A method of producing a load cell main body of a weighing scale with load cell, comprising the steps of:
(a) producing an integral metallic casting of the load cell main body comprising: parallelogram consisting of a base side, a moving side for bearing a load and arms each having one end thereof inter-connected to said base side and the other end inter-connected to said moving side and extending vertically in parallel with each other; a beam having one end thereof inter-connected to said base side and the other end as a pressure-receiving section inter-connected to said lower arm via a first runner rib and supporting thereon strain gauges; a load transmission section having one end thereof inter-connected to said moving side and the other end opposed to said pressure-receiving section; and a stopper fitting section for fitting a stopper and having one end thereof inter-connected to said base side and the other end inter-connected to the other end of said load transmission section via a second runner rib;
(b) cutting off said first runner rib of said casting of the load cell main body to separate said beam from said arms; and
(c) cutting off said second runner rib to separate said stopper fitting section from said load transmission section, thereby forming said load cell main body.

10. A weighing scale including a load cell, comprising:
a fixed base;
a perpendicular base side secured to said base;
a perpendicular moving side for bearing a load;
a first arm connecting the upper portions of said base side and said moving side;
a second arm connecting the lower portions of said base side and said lower side, said sides and arms being integral with one another and together forming an integral parallelogram;
a horizontal rib being integral with said sides and bridging said sides, said rib being discontinuous adjacent a midpoint along the length of said rib, the portions of said rib on either side of said discontinuity respectively forming a load transmission section and a stopper fitting section;
a horizontal beam extending from said base side towards said moving side, said beam being integral with said base side and including a portion defining a parallelogram;
a plurality of strain gauges bonded to said parallelogram;
a pivot shaft coupling the tip of said beam to said load transmission section; and
electronic circuit components including temperature compensation circuits electrically connected to said strain gauges and physically fitted to one surface of said base side.

11. A load cell casting formed by integral molding of members comprising:
a fixed base;
a perpendicular base side;
a perpendicular moving side for bearing a load;
a first arm connecting the upper portions of said base side and said moving side;
a second arm connecting the lower portions of said base side and said lower side, said sides and arms together forming an integral parallelogram;
a horizontal rib bridging said sides and forming a load transmission section and a stopper fitting section, said load transmission section and stopper fitting section being integrally molded by precision casting;
a horizontal beam extending from said base side toward said moving side, said beam being integral with said base side and including a portion defining a parallelogram; and
a blank rib integrally molded between said horizontal rib and said horizontal beam and coupling said horizontal rib and horizontal beam.

* * * * *